No. 701,805. Patented June 3, 1902.
J. W. ELLISON.
SHOVEL.
(Application filed Oct. 29, 1901.)

(No Model.)

Witnesses
H. L. Amer.
W. Schmidt

Inventor
John W. Ellison,
By Victor J. Evans
Attorney

UNITED STATES PATENT OFFICE.

JOHN W. ELLISON, OF FLORENCE, MISSISSIPPI.

SHOVEL.

SPECIFICATION forming part of Letters Patent No. 701,805, dated June 3, 1902.

Application filed October 29, 1901. Serial No. 80,466. (No model.)

*To all whom it may concern:*

Be it known that I, JOHN W. ELLISON, a citizen of the United States, residing at Florence, in the county of Rankin and State of Mississippi, have invented new and useful Improvements in Shovels, of which the following is a specification.

My invention relates to shovels; and its object is to provide a shovel of novel, strong, and durable construction at small cost.

The improved shovel is preferably constructed entirely of metal; and the invention consists in a shovel comprising a blade and handle-socket formed from a single piece of metal and a handle detachably secured within the socket.

The construction of the improvement will be fully described hereinafter in connection with the accompanying drawings, which form part of this specification, and its novel features will be defined in the appended claim.

Figure 1:
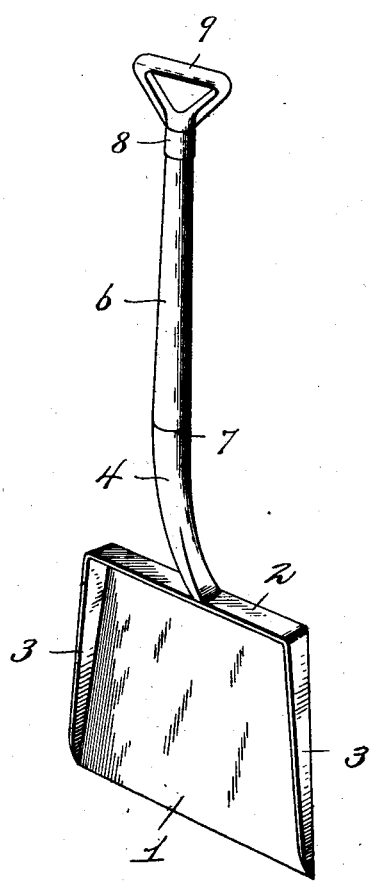
Figure 2:
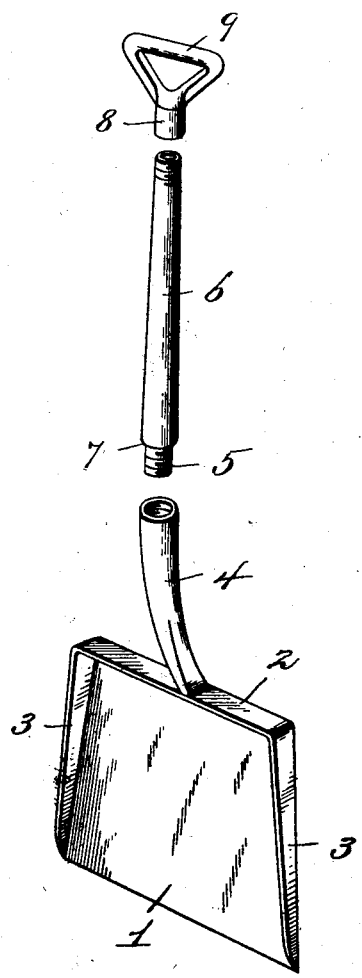

In the drawings, Figure 1 is a view in perspective of a shovel constructed in accordance with the invention, and Fig. 2 is a similar view showing the parts of the shovel disconnected.

The reference-numeral 1 designates the shovel-blade, formed with a transverse forwardly-extending flange 2 at its upper edge, serving as a rest for the foot in forcing the blade into the ground, and with or without the integral tapering side flanges 3.

4 designates the handle-socket, formed in the same piece with the blade and curved to the usual shape. This socket is hollow and internally screw-threaded at its upper end to receive the externally-threaded lower end 5 of a hollow handle 6. The lower end of the handle is formed with a shoulder 7 to insure a neat joint between the handle and socket. The upper end of the handle is externally screw-threaded and fits within an internally-threaded socket 8, depending from a handhold 9, the latter being preferably flattened to adapt it for use as a tamper.

The shovel constructed as above described consists of three parts, which are firmly but detachably united without the aid of rivets, and the improvement provides a light and simple but very strong and durable shovel.

I claim—

A shovel comprising a blade having a forwardly-inclined integral socket at the center of the upper end thereof, said socket being hollow and internally screw-threaded at its upper terminal, a hollow handle with a lower externally-screw-threaded shouldered terminal to removably fit in the said socket, said handle being also provided with screw-threads at its opposite extremity, and a handhold having a central depending internally-screw-threaded socket to removably fit on the upper screw-threaded terminal of the handle, the said handhold being flattened to adapt it for use as a tamper of substantially inverted triangular shape.

In testimony whereof I affix my signature in presence of two witnesses.

JOHN W. ELLISON.

Witnesses:
J. H. SOUTH,
WM. AILLS, Jr.